(12) United States Patent
Okuda

(10) Patent No.: US 7,864,750 B2
(45) Date of Patent: Jan. 4, 2011

(54) LOAD DISTRIBUTING APPARATUS AND LOAD DISTRIBUTING METHOD

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 707 days.

(21) Appl. No.: 11/208,735

(22) Filed: Aug. 23, 2005

(65) Prior Publication Data

US 2006/0209787 A1    Sep. 21, 2006

(30) Foreign Application Priority Data

Mar. 15, 2005 (JP) .............. 2005-073476

(51) Int. Cl.
*H04L 12/28* (2006.01)

(52) U.S. Cl. .............. 370/351; 709/203

(58) Field of Classification Search .............. 370/351, 370/392, 473; 709/203, 246
See application file for complete search history.

(56) References Cited

U.S. PATENT DOCUMENTS

| | | | |
|---|---|---|---|
| 6,650,640 B1 * | 11/2003 | Muller et al. .............. 370/392 |
| 7,079,493 B2 | 7/2006 | Nakamichi et al. | |
| 7,590,736 B2 | 9/2009 | Hydrie et al. | |
| 7,606,929 B2 | 10/2009 | Gbadegesin et al. | |
| 7,613,822 B2 | 11/2009 | Joy et al. | |
| 7,636,917 B2 | 12/2009 | Darling et al. | |
| 2002/0038339 A1 * | 3/2002 | Xu .............. 709/203 |
| 2003/0009559 A1 | 1/2003 | Ikeda | |
| 2003/0037165 A1 | 2/2003 | Shinomiya | |
| 2004/0039847 A1 * | 2/2004 | Persson et al. .............. 709/250 |
| 2004/0264364 A1 * | 12/2004 | Sato .............. 370/217 |
| 2005/0111474 A1 | 5/2005 | Kobayashi | |

FOREIGN PATENT DOCUMENTS

| | | |
|---|---|---|
| JP | 2000-013439 A | 1/2000 |
| JP | 2002-164930 A | 6/2002 |
| JP | 2002-204250 A | 7/2002 |
| JP | 2003-023444   | 1/2003 |
| JP | 2003-023444 A | 1/2003 |

(Continued)

OTHER PUBLICATIONS

"Japanese Office Action", mailed by JPO and corresponding to Japanese application No. 2005-073476 on May 11, 2010, with English translation.

(Continued)

*Primary Examiner*—Man Phan
*Assistant Examiner*—Wei Zhao
(74) *Attorney, Agent, or Firm*—Fujitsu Patent Center

(57) ABSTRACT

A load distributing apparatus is connected to a plurality of routers carrying out a transfer process of multicast data. The load distributing apparatus includes a network interface unit that receives a packet via a network, a packet identifying unit that identifies the packet received as a join message or a prune message, a path-sorting-rule storing unit that stores a path-sorting rule for sorting the packet to the routers, and a packet sorting unit that sorts the packet that is identified by the packet identifying unit to the routers based on the path-sorting rule stored in the path-sorting-rule storing unit.

20 Claims, 16 Drawing Sheets

FOREIGN PATENT DOCUMENTS

| | | |
|---|---|---|
| JP | 2003-131961 A | 5/2003 |
| JP | 2003-143193 | 5/2003 |
| JP | 2003-143193 A | 5/2003 |
| JP | 2003-348136 A | 12/2003 |
| JP | 2004-064649 | 2/2004 |
| JP | 2004-274112 A | 9/2004 |
| JP | 2005-027304 A | 1/2005 |
| WO | WO-2004/040860 | 5/2004 |

OTHER PUBLICATIONS

Inoue, Takeru et al., "Design and Implementation of the Incrementally Deployable Multicast System Based on Flexcast", The IEICE Transactions on information and systems (J88-D-I), No. 2, The Institute of Electronics, Information and Communication Engineers, No. 398, Japan, Feb. 1, 2005, pp. 272-291.

"Japanese Office Action" mailed by JPO and corresponding to Japanese application No. 2005-073476 on Aug. 20, 2010, with English translation.

* cited by examiner

FIG.4

| IDENTIFICATION RULE | | | PACKET TYPE | PACKET SORTING DESTINATION |
|---|---|---|---|---|
| DESTINATION MAC ADDRESS | DESTINATION IP ADDRESS | Type | | |
| 01-00-5E-00-00-00 (UPPER 25 BITS) | - | - | IGMPv1 Report | JOIN-PRUNE-MESSAGE PROCESSING UNIT |
| 01-00-5E-00-00-02 | 224.0.0.2 | 0x16 | IGMPv2 Report | JOIN-PRUNE-MESSAGE PROCESSING UNIT |
| 01-00-5E-00-00-22 | 224.0.0.22 | 0x17 | IGMPv2 Leave | JOIN-PRUNE-MESSAGE PROCESSING UNIT |
| | | - | IGMPv3 Report | JOIN-PRUNE-MESSAGE PROCESSING UNIT |
| 33-33-00-00-00-00 (UPPER 16 BITS) | - | 131 | MLDv1 Report | JOIN-PRUNE-MESSAGE PROCESSING UNIT |
| 33-33-00-00-00-02 | FF02::02 | 132 | MLDv1 Done | JOIN-PRUNE-MESSAGE PROCESSING UNIT |
| 33-33-00-00-00-16 | FF02::16 | - | MLDv2 | JOIN-PRUNE-MESSAGE PROCESSING UNIT |
| 01-00-5E-00-00-13 | 224.0.0.13 | n/a | PIM-Hello/Assert (IPv4) | HELLO-MESSAGE PROCESSING UNIT |
| 33-33-00-00-00-D | FF02::D | n/a- | PIM-Hello/Assert (IPv6) | HELLO-MESSAGE PROCESSING UNIT |
| Any | Any | n/a | - | PACKET TRANSFERRING UNIT |

| MULTICAST ADDRESS | OUTPUT PATH |
|---|---|
| MULTICAST ADDRESS A | PORT 1 |
| MULTICAST ADDRESS B | PORT 2 |
| MULTICAST ADDRESS C | PORT 3 |
| . . . | . . . |

| CALCULATED VALUE | OUTPUT PATH |
|---|---|
| 0 | PORT 1 |
| 1 | PORT 2 |
| ... | ... |

FIG.13

| MULTICAST ADDRESS | OUTPUT PATH | FLAG |
|---|---|---|
| MULTICAST ADDRESS A | PORT 1 | 0 |
| MULTICAST ADDRESS B | PORT 2 | 0 |
| MULTICAST ADDRESS C | PORT 3 | 1 |
| . . . | . . . | . . . |

FIG.14

| OUTPUT PATH | NUMBER OF ENTRIES |
|---|---|
| PORT 1 | 2 |
| PORT 2 | 1 |

| SOURCE ADDRESS | OUTPUT PATH |
|---|---|
| IP ADDRESS A | PORT 1 |
| IP ADDRESS B | PORT 2 |
| IP ADDRESS C | PORT 3 |
| . . . | . . . |

| MULTICAST ADDRESS | PRIORITY | OUTPUT PATH |
|---|---|---|
| MULTICAST ADDRESS A | HIGH | PORT 1 |
| MULTICAST ADDRESS B | LOW | PORT 2 |
| MULTICAST ADDRESS C | LOW | PORT 3 |
| . . . | . . . | . . . |

LOAD DISTRIBUTING APPARATUS AND LOAD DISTRIBUTING METHOD

BACKGROUND OF THE INVENTION

1. Field of the Invention

The present invention relates to a load distributing apparatus and a load distributing method to carry out a load distribution for a transfer process of multicast data, and more particularly, to a load distributing apparatus and a load distributing method that can realize the load distribution for the multicast data without placing a load to a router, and carry out a high-speed transfer start operation.

2. Description of the Related Art

When it is required to send the same information to multiple terminals at a time in a network employing transmission control protocol/Internet protocol, a commonly used method is a multicast. For example, the multicast is used for video distribution in the Internet.

In a communication based on a unicast, when sending the same data to a plurality of terminals, it is necessary to create packets having the same contents as many as the number of the terminals, and send the packets to the terminals by specifying an internet protocol (IP) address for each of the terminals. However, in a communication based on the multicast, it is possible to send a single packet to a plurality of terminals by specifying an address that is allocated as a multicast address. For this reason, it is possible to reduce a load on the network.

When the communication based on the multicast is carried out across a plurality of networks, it is necessary to carry out a route control using a protocol referred to as a multicast routing protocol. A typical multicast routing protocol is a protocol independent multicast sparse mode (PIM-SM) that can build a communication route referred to as a multicast tree efficiently using a Join/Prune message.

A router (relay apparatus) employing the PIM-SM notifies a neighboring network router of its presence by sending a hello message periodically. The hello message also takes a roll of preventing a redundant transfer of multicast data. When a plurality of router is connected to a local area network (LAN), if each of the routers carries out a relay of the multicast data, there is a possibility that a number of the same packets are sent on the LAN. To prevent this from happening, each of the routers receives the hello message, and when a presence of other router on the same LAN is confirmed, only a router having the biggest IP address becomes a designated router (DR) that takes a relay of the multicast data.

In this manner, it is possible to prevent a redundant transfer of the multicast data by having the DR only carry out the relay of the multicast data. However, when it is necessary to process a large amount of multicast data, a load on the DR becomes extremely heavy. To cope with this problem, Japanese Patent Application Laid-Open Publication 2003-23444 discloses a technology that operates a plurality, of router as a single router in a virtual manner using a virtual router redundancy protocol (VRRP), and extends the routers so that the routers exchange a message for exclusively setting a multicast address for a transfer process. By employing this technology, each of the routers carries out a transfer process of data corresponding to the multicast address allocated to it, and as a result, it is possible to realize a load distribution.

However, when the technology disclosed in the above literature, each of the routers has to operate the VRRP in addition to a normal protocol for the multicast, such as the PIM-SM, which causes an additional load on the router. In addition, because an allocation of the multicast address for a transfer is determined by exchanging a message between the routers, the exchange of the message becomes an overhead. As a result, a high-speed transfer start operation is not possible.

SUMMARY OF THE INVENTION

It is an object of the present invention to solve at least the above problems in the conventional technology.

A load distributing apparatus according to one aspect of the present, which is connected to a plurality of routers carrying out a transfer process of multicast data, includes a network interface unit that receives a packet via a network; a packet identifying unit that identifies the packet received as a join message or a prune message; a path-sorting-rule storing unit that stores a path-sorting rule for sorting the packet to the routers; and a packet sorting unit that sorts the packet that is identified by the packet identifying unit to the routers based on the path-sorting rule stored in the path-sorting-rule storing unit.

A method according to another aspect of the present invention, which is for controlling a plurality of routers carrying out a transfer process of multicast data, includes receiving a packet via a network; identifying the packet received as a join message or a prune message; and sorting the packet that is identified by the packet identifying unit to the routers based on a path-sorting rule stored in a path-sorting-rule storing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table for illustrating an example of an identification rule for the packet identifying unit shown in FIG. 3;

FIG. 13 is a table for illustrating an example of a path sorting rule for the join-prune-packet sorting unit shown in FIG. 12;

FIG. 14 is a table for illustrating an example of entry number information according to a path;

DETAILED DESCRIPTION OF THE PREFERRED EMBODIMENTS

Exemplary embodiments of the present invention will be explained in detail below with reference to the accompanying drawings.

Figure 25:
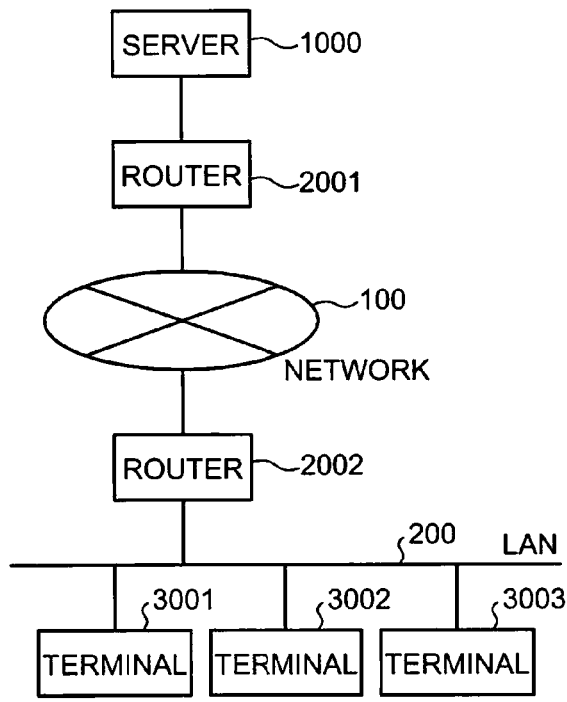
FIG. 25 is a schematic diagram for illustrating an example of a network configuration for carrying out a multicast.

FIG. 25 is a schematic diagram for illustrating an example of a network configuration for carrying out a multicast. A server 1000 that transmits data is connected to a network 100 via a router 2001. Terminals 3001 to 3003 that receive the data are connected to a LAN 200. The LAN 200 is connected to the Internet 100 via a router 2002.

Figure 26:
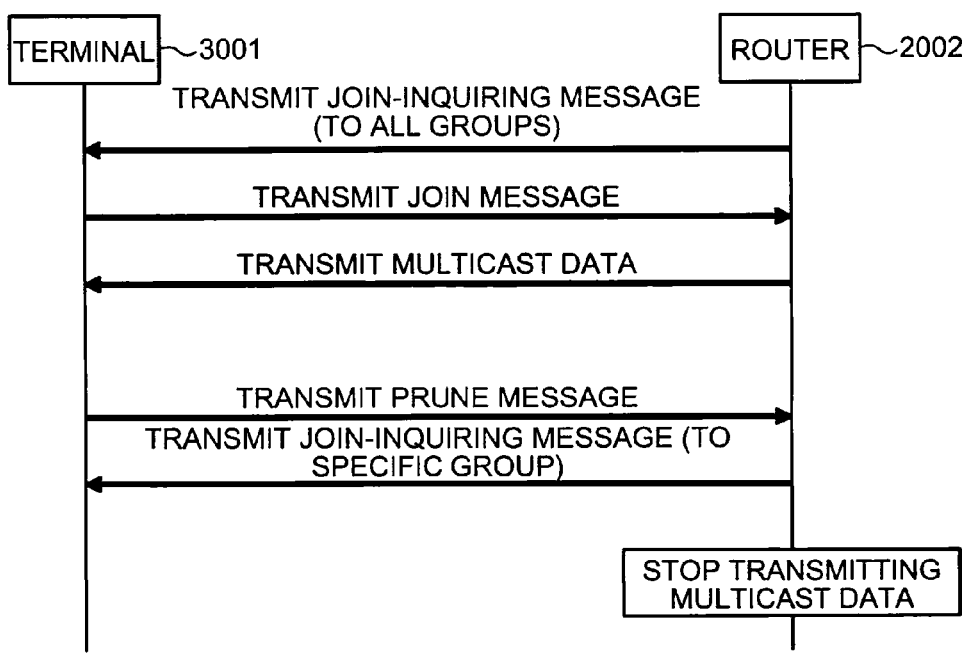
FIG. 26 is a sequence diagram for a communication procedure for carrying out a multicast.

To transmit multicast data from the server 1000 to the terminals 3001 to 3003, it is necessary to carry out a predetermined procedure both between the router 2001 and the router 2002 and between the router 2002 and the terminals 3001 to 3003. Following is an explanation for a procedure between the router 2002 and the terminals 3001 to 3003. FIG. 26 is a sequence diagram for a communication procedure for carrying out a multicast.

The router 2002 carries out a multicast of a join-inquiring message to inquire whether there is a terminal to receive a multicast on the LAN 200. Terminals that receive data of the same multicast address are referred to as a multicast group. However, the join-inquiring message is transmitted at a constant time interval, without designating a specific multicast group. The terminal 3001 that receives the join-inquiring message carries out a multicast of a join message with the multicast address received as a destination. Then, the router 2002 that receives the join message from the terminal 3001 starts a transfer of data of the multicast address designated.

When ending a reception of the multicast, the terminal 3001 carries out a multicast of a prune message. To confirm whether a multicast group that receives data of the multicast address designated in the prune message is remained on the LAN 200, the router 2002 that receives the prune message carries out a multicast of a join-inquiring message in which the multicast group is designated. Then, if there is no response of the join message for a predetermined time, a transmission of the data of the multicast address is stopped.

Figure 27:
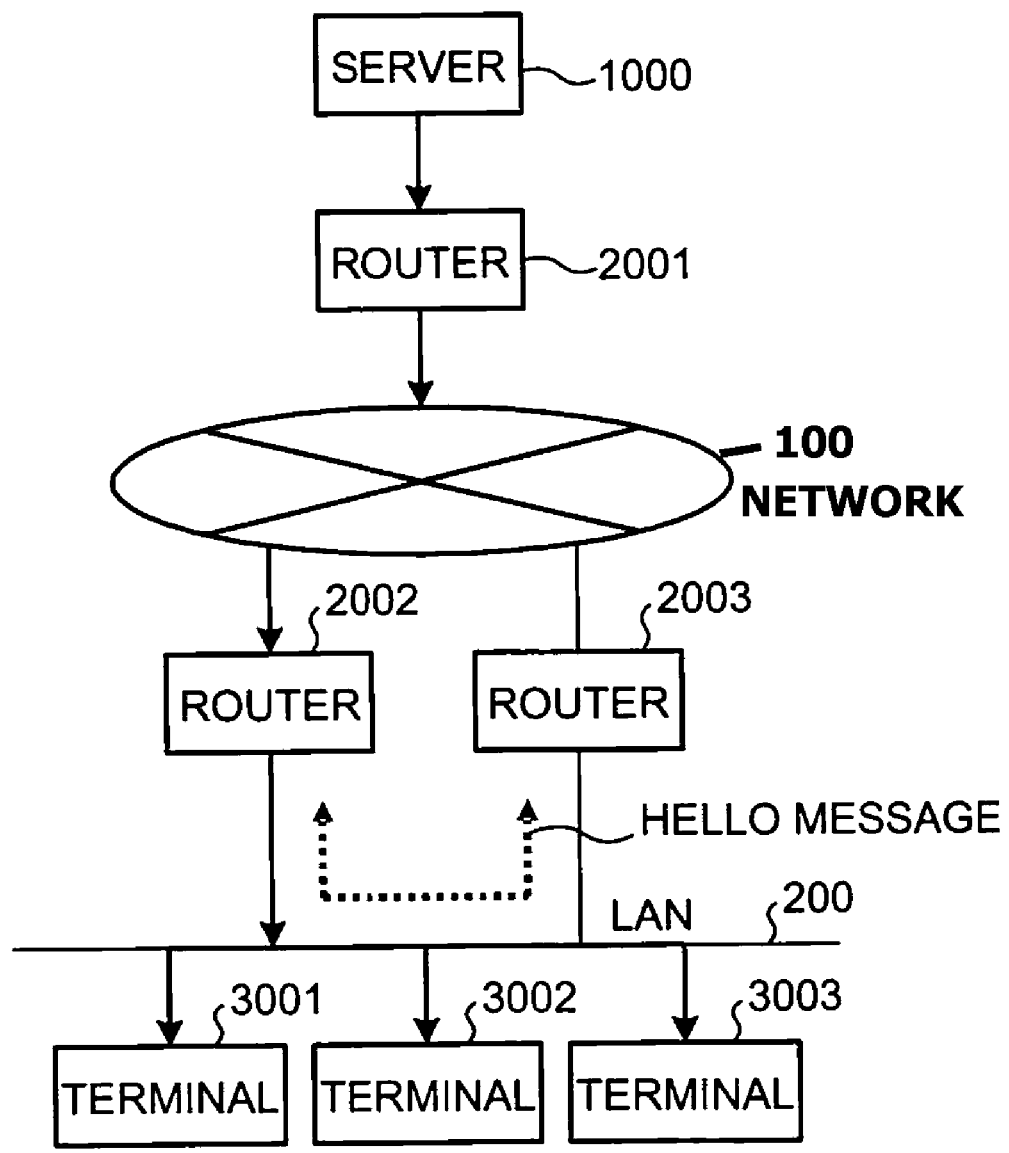
FIG. 27 is a schematic diagram for explaining an operation of a network including a plurality of routers.

Let us consider a case in which a plurality of routers is connected to the LAN 200. If each of the routers carries out a relay of the multicast, there is a possibility that the same data is transmitted on the LAN 200 in a redundant manner. To avoid this kind of happening, when a plurality of routers is connected to a LAN, only one router is allowed to carry out a relay of the multicast. FIG. 27 is a schematic diagram for explaining an operation of a network including a plurality of routers.

The figure shows an example in which the router 2002 and a router 2003 are connected to the LAN 200. Each of the router 2002 and the router 2003 carries out a multicast of a hello message at a constant time interval. Then, a router having the biggest IP address (in the example shown in FIG. 27, the router 2002 is assumed to have the biggest IP address) becomes a DR that takes the relay of the multicast data.

In this manner, by making only one router become the DR and take the relay of the multicast data, it is possible to avoid a redundant transmission of the same data on the LAN 200. However, when there is a need for relaying a large amount of multicast data, a load is centered on the router 2002 that became the DR, and a process capability of the router 2003 is not utilized effectively.

Figure 1:
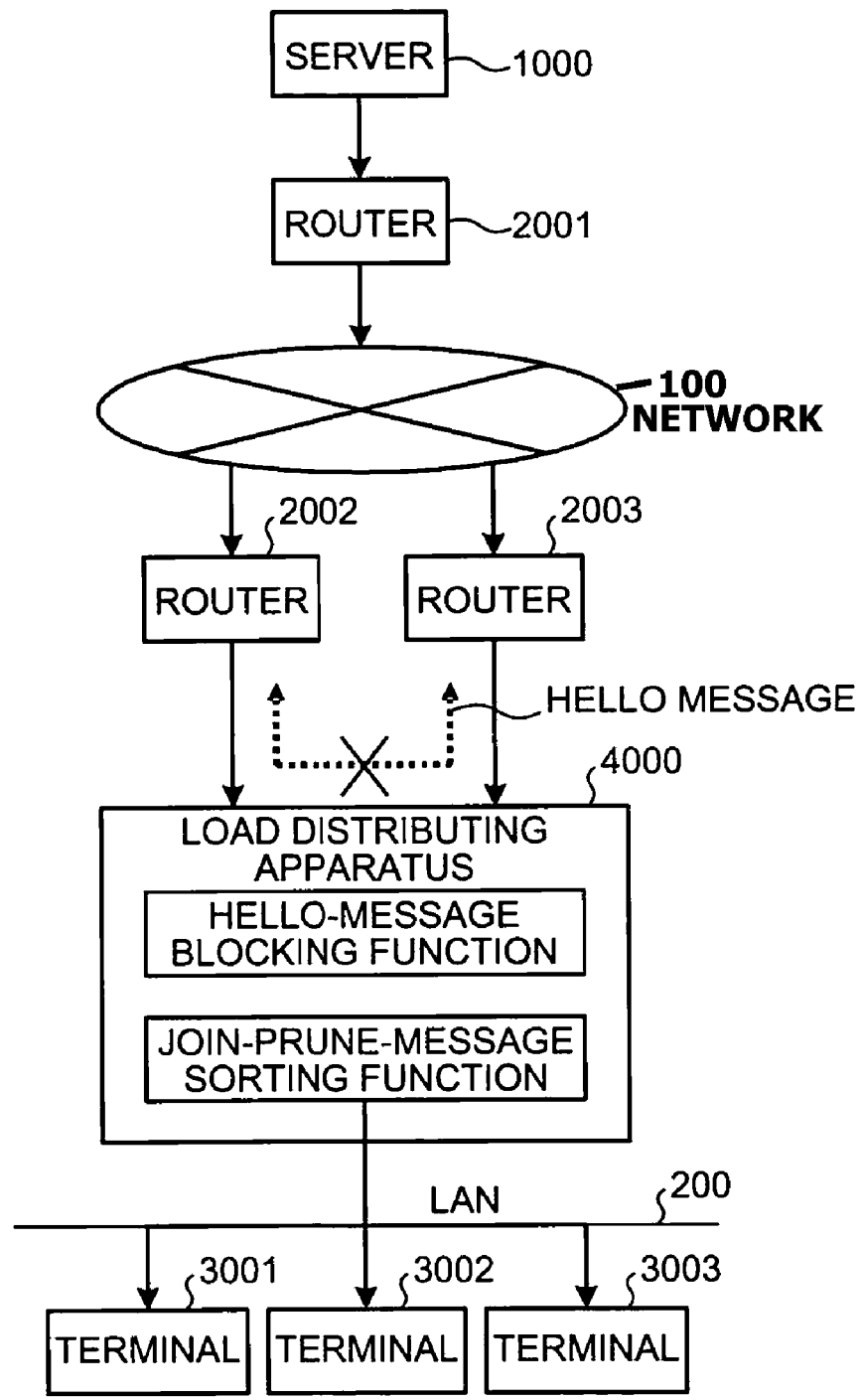
FIG. 1 is a schematic diagram for explaining a principle of a load distributing method according to a first embodiment of the present invention.

FIG. 1 is a schematic diagram for explaining a principle of a load distributing method according to a first embodiment of the present invention. As shown in the figure, in the load distributing method according to the first embodiment, a load distributing apparatus 4000 is arranged between the router 2002 and the router 2003, so that the load distributing apparatus 4000 is connected to the LAN 200.

The load distributing apparatus 4000 has a hello-message stop function and a join-prune-message sorting function. The hello-message stop function stops the hello message sent by the router 2002 and the router 2003, so that other router does not receive the hello message. By stopping the hello message, it is possible to prevent only a single router from becoming the DR, and as a result, both the router 2002 and the router 2003 can carry out the transfer process of the multicast data.

The join-prune-message sorting function sorts a join message and a prune message sent by the terminals 3001 to 3003 to any one of the router 2002 and the router 2003 based on a predetermined rule. By sorting the join message and the prune message, a distribution of the multicast address to be transferred is determined, and as a result, a load distribution for the transfer process can be realized. Because the router does not need to carry out any particular process for realizing the load distribution, the router does not take an extra burden.

In addition, because it is not necessary to exchange messages between the routers for the load distribution, it is possible to carry out a high-speed operation. Furthermore, the router 2002 and the router 2003 do not receive a join message and a prune message that are not related thereto because the load distributing apparatus 4000 sorts the join message and the prune message. Therefore, it is possible to reduce the load on the routers.

For example, when the terminal 3001 transmits a join message for receiving data of a multicast address A, and the join-prune-message sorting function sorts the message to the router 2002, the router 2002 takes a role of transferring the data of the multicast address A. In this case, even if the terminal 3002 or the terminal 3003 sends a join message for receiving the data of the multicast address A, the message is sorted to the router 2002 based on the same rule, and as a result, the router 2003 does not transfer the same multicast data on the LAN 200.

In addition, when any one of the terminals 3001 to 3003 sends a prune message to stop a reception of the data of the multicast address A, the message is sorted to the router 2002 based on the same rule, and the prune message is processed appropriately. In this manner, the sorting of the join message and the prune message is exclusively carried out in the load distributing apparatus 4000, and it is not necessary to provide any particular extension to each of the routers.

Figure 2:
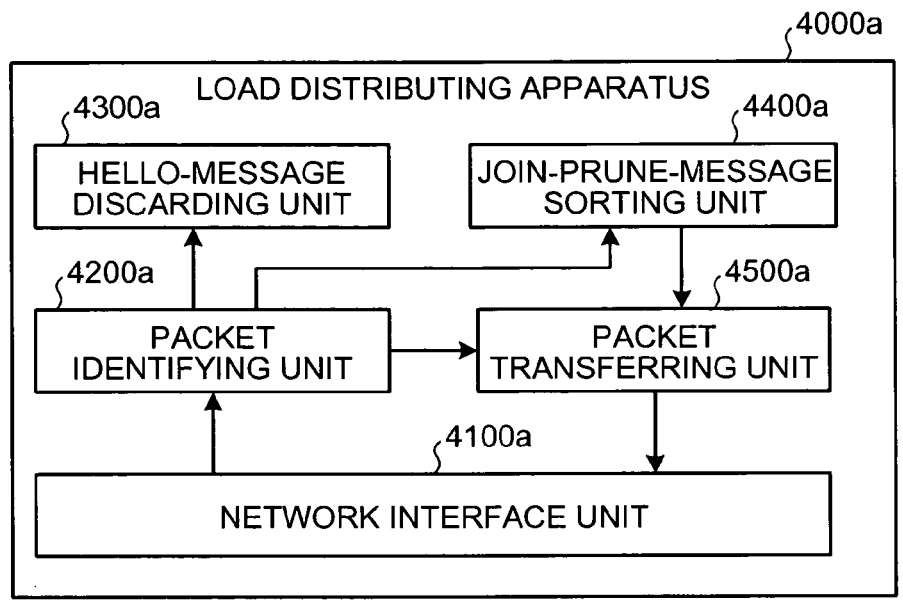
FIG. 2 is a functional block diagram of a load distributing apparatus according to the first embodiment.

FIG. 2 is a functional block diagram of a load distributing apparatus according to the first embodiment. As shown in the figure, a load distributing apparatus 4000a includes a network interface unit 4100a, a packet identifying unit 4200a, a hello-message discarding unit 4300a, a join-prune-packet sorting unit 4400a, and a packet transferring unit 4500a.

The network interface unit 4100a is an interface unit for carrying out an exchange of packets via a network. The network interface unit 4100a includes a plurality of ports for connecting to the routers and one or more ports for connecting to the LAN. The ports for connecting to the routers does not necessarily have to be a plurality of numbers physically, but can be divided into a plurality of ports virtually by a virtual LAN (VLAN).

The packet identifying unit 4200a identifies a type of the packet received by the network interface unit 4100a, and delivers the packet to a corresponding processing unit based on the type of the packet identified. When the packet received is identified as a hello message, the packet is delivered to the hello-message discarding unit 4300a, when the packet received is identified as a join message or a prune message, the packet is delivered to the join-prune-packet sorting unit 4400a, and when the packet received is identified as other type of packet, the packet is delivered to the packet transferring unit 4500a.

Figure 3:
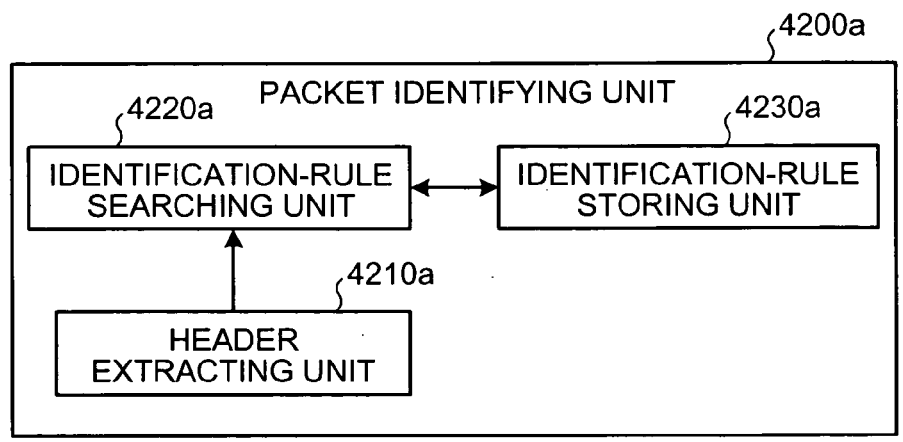
FIG. 3 is a functional block diagram of a packet identifying unit of the load distributing apparatus according to the first embodiment.

FIG. 3 is a functional block diagram of the packet identifying unit 4200a of the load distributing apparatus according to the first embodiment. As shown in the figure, the packet identifying unit 4200a includes a header extracting unit 4210a, an-identification-rule searching unit 4220a, and an identification-rule storing unit 4230a. The header extracting unit 4210a is a processing unit that extracts information necessary for identifying the type of the packet from a header part of the packet. The identification-rule searching unit 4220a searches for an identification rule stored in the identification-rule storing unit 4230a by using the information extracted by the header extracting unit 4210a as a key, and determines a sorting destination based on the identification rule searched.

The identification-rule storing unit 4230a stores the identification rule for identifying and sorting the packet received. FIG. 4 is a table for illustrating an example of the identification rule for the packet identifying unit 4200a shown in FIG. 3. As shown in the figure, an identification of the type of the packet is carried out based on a destination media-access-control (MAC) address, a destination IP address, and a value of a TYPE field of a payload unit. For example, a packet having the destination MAC address of 01-00-5E-00-00-02, the destination IP address of 224.0.0.2, and the value of the TYPE field of the payload unit of 0×17 is identified as a type of the prune message, and is sorted to the join-prune-packet sorting unit 4400a.

The hello-message discarding unit 4300a is a processing unit that discards the hello message without transferring it. As a result of the hello-message discarding unit 4300a discarding the hello message, the hello message is not received by the routers, and it is possible to prevent only a single router from becoming the DR. Therefore, all of the routers become ready to carry out a transfer of the multicast data.

The join-prune-packet sorting unit 4400a is a processing unit that determines a destination router to sort the join message and the prune message based on a predetermined rule. There are many kinds of methods to sort the join message and the prune message. However, according to the present embodiment, the join message and the prune message are sorted based on a static table in which a sorting destination is defined for each of the multicast addresses.

Figures 5, 6:
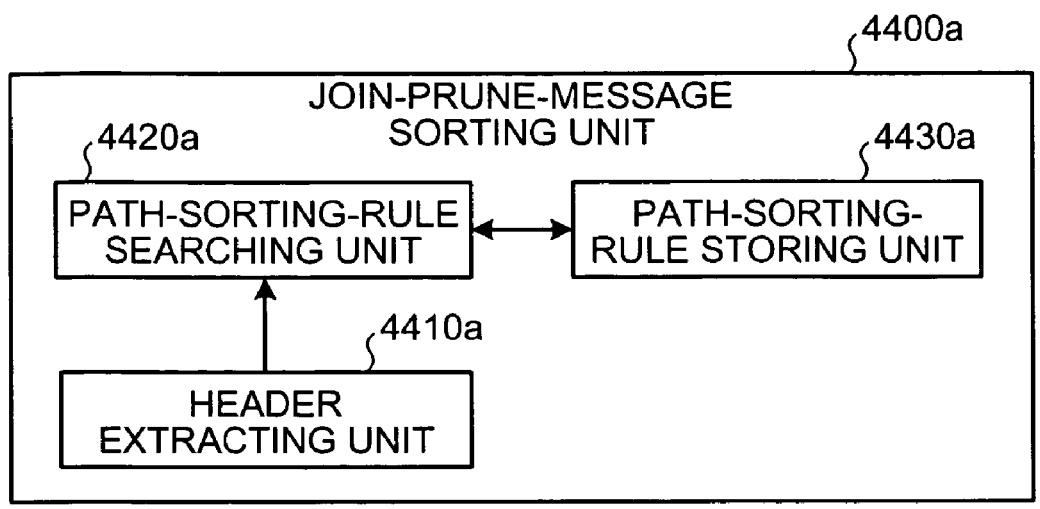
FIG. 5 is a functional block diagram of a join-prune-packet sorting unit of the load distributing apparatus according to the first embodiment.
FIG. 6 is a table for illustrating an example of a path sorting rule for the join-prune-packet sorting unit shown in FIG. 5.

FIG. 5 is a functional block diagram of the join-prune-packet sorting unit 4400a. The join-prune-packet sorting unit 4400a includes a header extracting unit 4410a, a path-sorting-rule searching unit 4420a, and a path-sorting-rule storing unit 4430a. The header extracting unit 4410a is a processing unit that extracts information necessary for determining the sorting destination from a header part of the packet. The path-sorting-rule searching unit 4420a searches for a path-sorting rule stored in the path-sorting-rule storing unit 4430a by using the information extracted by the header extracting unit 4410a as a key, and determines the sorting destination based on the path-sorting rule searched.

The path-sorting-rule storing unit 4430a stores the path-sorting rule for sorting the packet received. FIG. 6 is a table for illustrating an example of the path sorting rule for the join-prune-packet sorting unit 4400a shown in FIG. 5. The path-sorting rule holds a pair of the multicast address and an output path of a packet corresponding to the multicast address. For example, a packet having a multicast address A is output from a port 1 of the network interface unit 4100a.

The path-sorting rule is a static one that is preset by an administrator and the like. In addition, the multicast address can be an IP address or a MAC address. Furthermore, the output path can be a physical port or a logical port of the VLAN and the like.

The packet transferring unit 4500a is a processing that transfers the packet delivered from the packet identifying unit 4200a and the join-prune-packet sorting unit 4400a, via the network interface unit 4100a. The packet delivered from the join-prune-packet sorting unit 4400a is transferred to a port that is designated by the join-prune-packet sorting unit 4400a only.

Figure 7:
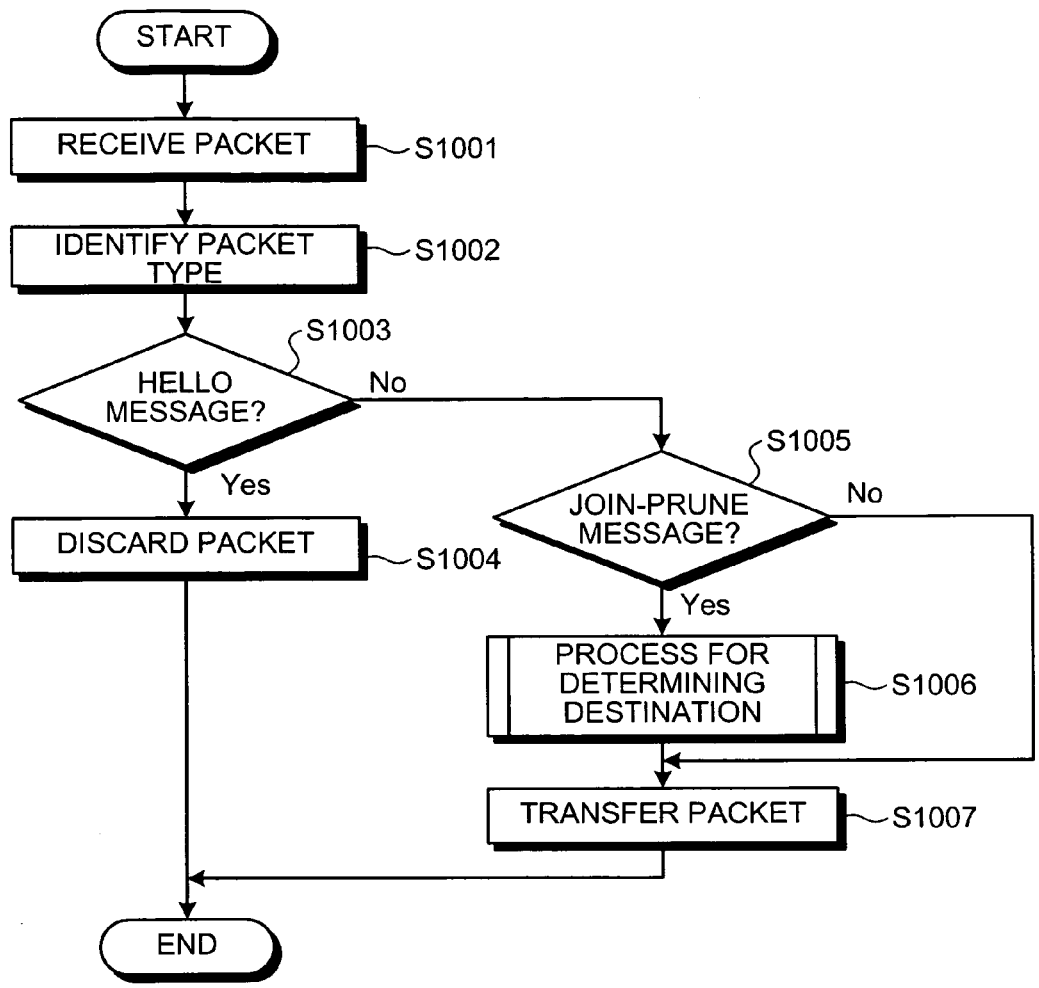
FIG. 7 is a flowchart of a process procedure for the load distributing apparatus according to the first embodiment.

FIG. 7 is a flowchart of a process procedure for the load distributing apparatus 4000a according to the first embodiment. As shown in the figure, the load distributing apparatus 4000a receives a packet (Step S1001), and identifies a type of the packet received at the packet identifying unit 4200a (Step S1002). When the packet is a hello message (YES at Step S1003), the load distributing apparatus 4000a discards the packet at the hello-message discarding unit 4300a (Step S1004).

When the packet is not a hello message (NO at Step S1003), but is a join message or a prune message (YES at Step S1005), the load distributing apparatus 4000a carries out a process for determining a transfer destination to determine a destination router at the join-prune-packet sorting unit 4400a (Step S1006), and carries out a transfer of the packet at the packet transferring unit 4500a (Step S1007). When the packet is neither a join message nor a prune message (NO at Step S 1005), the load distributing apparatus 4000a carries out a transfer of the packet at the packet transferring unit 4500a as it is (Step S1007).

Figure 8:
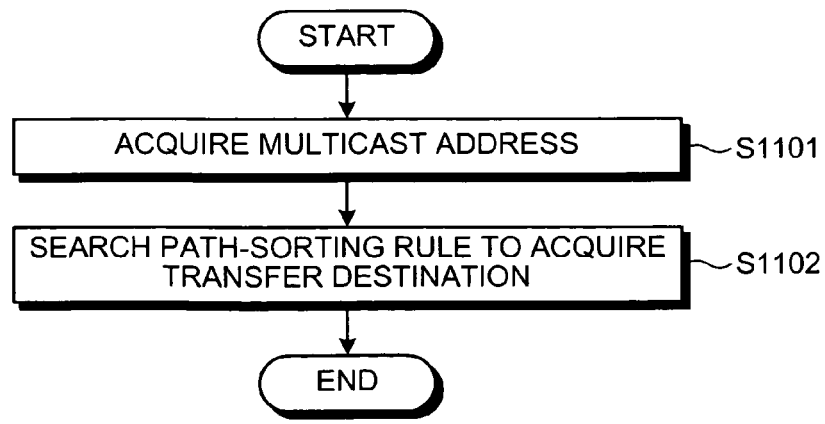
FIG. 8 is a flowchart of a process procedure for determining a transfer destination according to the first embodiment.

FIG. 8 is a flowchart of a process procedure for determining a transfer destination according to the first embodiment. As shown in the figure, the load distributing apparatus 4000a acquires a multicast address from the packet (Step S1101), searches for a path-sorting rule stored in the path-sorting-rule storing unit 4430a, acquires information on a transfer destination, and designates the transfer destination in the packet transferring unit 4500a based on the information acquired (Step S1102).

As described above, according to the first embodiment, the load distributing apparatus 4000a is provided between the routers, and the hello-message discarding unit 4300a discards the hello message. Therefore, when a plurality of routers is connected to the LAN, it is possible to make all of the routers ready to carry out a transfer of the multicast data.

Furthermore, according to the first embodiment, it is configured that the join message and the prune message from a terminal are sorted to the routers based on the path-sorting rule in which the transfer destination is defined for each of the multicast addresses. Therefore, it is possible to realize a load distribution of the-transfer process without placing a burden on each of the routers, and to achieve a high-speed transfer start operation.

Although a stop of the hello message is carried out in the hello-message discarding unit 4300a according to the present embodiment, it is also possible to stop the hello message by using a filtering of a layer2 switch. In this case, the load distributing apparatus 4000a does not need to include the hello-message discarding unit 4300a.

According to the first embodiment, the path-sorting rule is set based on the multicast address. However, in this case, because the path-sorting rule has to be set for all of the multicast addresses that have a possibility of being processed, there is a heavy burden on an administrator who sets the path-sorting rule. In addition, it is not possible to carry out a process for a join message and a prune message of a multicast address that is not set in the path-sorting rule. For this reason, a second embodiment of the present invention deals with a case in which the multicast address operation processed, and a sorting is carried out based on a result of the operation.

Figures 9, 10:
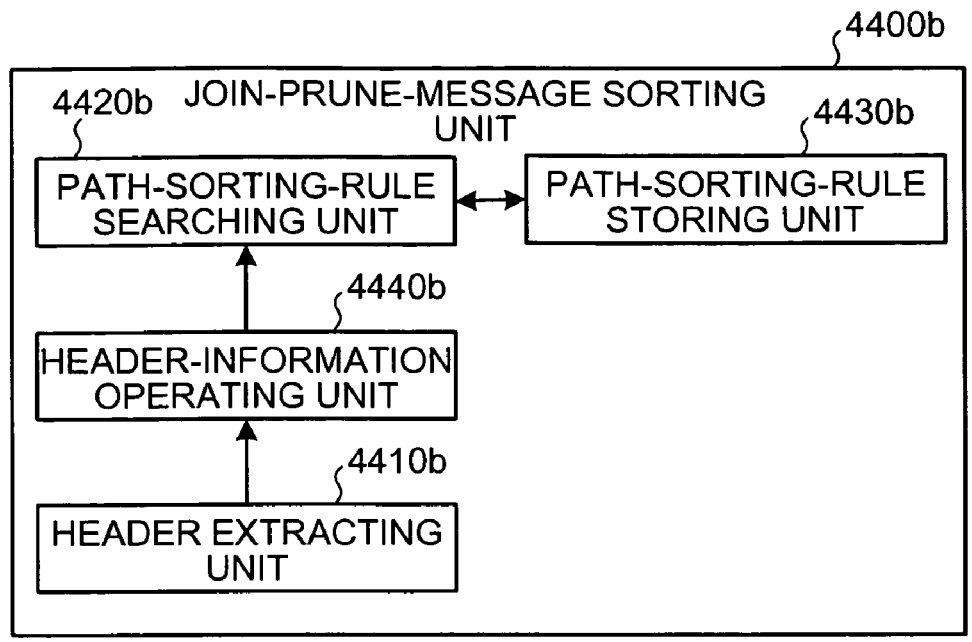
FIG. 9 is a functional block diagram of a join-prune-packet sorting unit of a load distributing apparatus according to a second embodiment of the present invention.
FIG. 10 is a table for illustrating an example of a path sorting rule for the join-prune-packet sorting unit shown in FIG. 9.

In a load distributing apparatus according to the second embodiment, the join-prune-packet sorting unit 4400a of the load distributing apparatus 4000a according to the first embodiment is replaced by a join-prune-packet sorting unit 4400b. FIG. 9 is a functional block diagram of the join-prune-packet sorting unit 4400b of the load distributing apparatus according to the second embodiment.

The join-prune-packet sorting unit 4400b includes a header extracting unit 4410b, a path-sorting-rule searching unit 4420b, a path-sorting-rule storing unit 4430b, and a header-information operating unit 4440b. The header extracting unit 4410b is a processing unit that extracts address information on the multicast address and the like from a header part of the packet. The header-information operating unit 4440b is a processing unit that converts the information extracted by the header extracting unit 4410b into a numerical value by a hash calculation and the like.

The-path-sorting-rule searching unit 4420b is a processing unit that searches for a path-sorting rule stored in the path-sorting-rule storing unit 4430b based on the numerical value converted by the header-information operating unit 4440b, and determines a sorting destination.

The path-sorting-rule storing unit 4430b stores the path-sorting rule for sorting the packet received. FIG. 10 is a table for illustrating an example of the path sorting rule for the join-prune-packet sorting unit 4400b shown in FIG. 9. The path-sorting rule holds a pair of a calculated value of the header-information operating unit 4400b and an output path of a packet corresponding to the calculated value. For example, a packet having the calculated value of zero is output from a port 1.

The path-sorting rule uses the multicast address by converting it into a numerical value, instead of using it directly. Therefore, it is not necessary to set a path-sorting rule for each of the multicast addresses, by taking an appropriate conversion into the numerical value.

Figure 11:
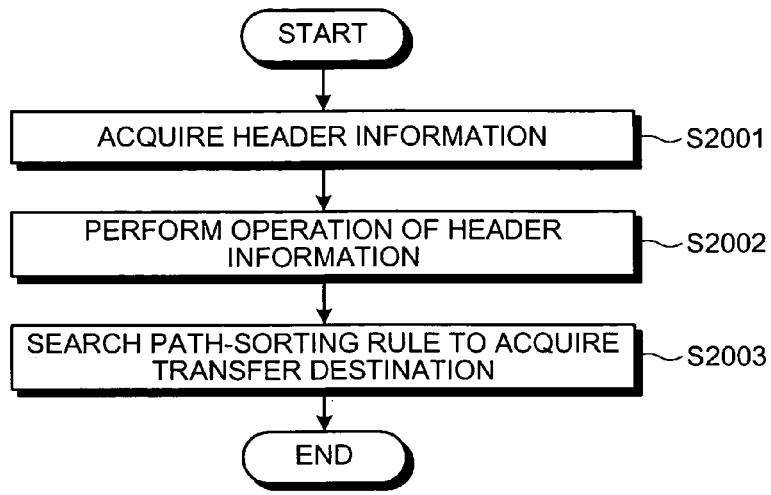
FIG. 11 is a flowchart of a process procedure for determining a transfer destination according to the second embodiment.

A process procedure of the load distributing apparatus according to the second embodiment is same as the process procedure of the load distributing apparatus according to the first embodiment except for the transfer-destination determining process. FIG. 11 is a flowchart of a process procedure for determining a transfer destination according to the second embodiment. The join-prune-packet sorting unit 4400b acquires a multicast address from a packet received (Step S2001), and carries out an operation process of the multicast address acquired (Step S 2002). Then, the join-prune-packet sorting unit 4400b searches for a path-sorting rule stored in the path-sorting-rule storing unit 4430b by using calculated value obtained from the operation process as a key, acquires information on a transfer destination, and designates the transfer destination based on the information acquired (Step S2003).

As described above, according to the second embodiment, it is configured that a multicast address included in a join message and a prune message sent from a terminal is converted into a numerical value, and a sorting destination is determined based on the numerical value converted. Therefore, it is possible to realize a sorting process without setting all of the multicast addresses in a path-sorting rule.

According to the first embodiment, a join message and a prune message are sorted based on a path-sorting rule that is defined in advance. However, a path sorting based on a pre-defined rule may cause the sorting destination to be biased on a specific router, resulting in an inappropriate load distribution. For this reason, a third embodiment of the present invention deals with a case in which the path-sorting rule is dynamically set, so that the load distribution is carried out evenly.

Figure 12:
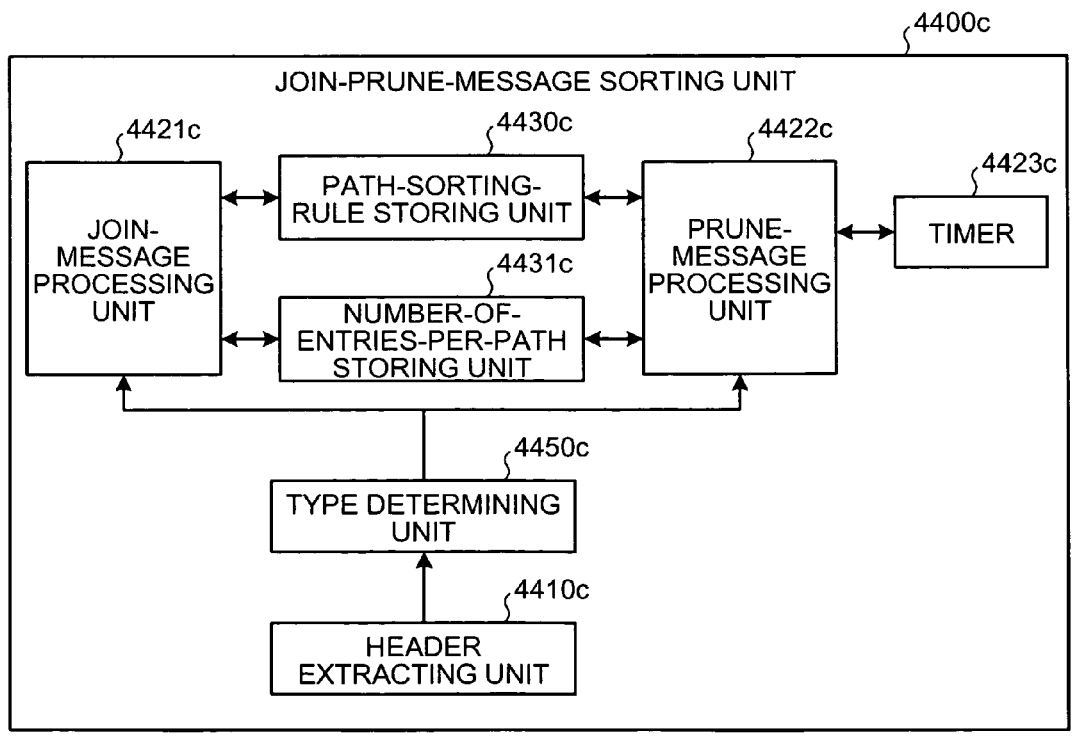
FIG. 12 is a functional block diagram of a join-prune-packet sorting unit of a load distributing apparatus according to a third embodiment of the present invention.

A configuration of a load distributing apparatus according to the second embodiment is the one in which the join-prune-packet sorting unit 4400a of the load distributing apparatus 4000a according to the first embodiment is replaced by a join-prune-packet sorting unit 4400c. FIG. 12 is a functional block diagram of the join-prune-packet sorting unit 4400c of the load distributing apparatus according to the third embodiment.

As shown in the figure, the join-prune-packet sorting unit 4400c includes a header extracting unit 4410c, a join-message processing unit-4421c, a prune-message processing unit 4422c, a timer 4423c, a path-sorting-rule storing unit 4430c, a number-of-entries-per-path sorting unit 4431c, and a type determining unit 4450c. The header extracting unit 4410c is a processing unit that extracts information for determining a type of a packet from a header part of the packet.

The type determining unit 4450c determines whether the packet received is a join message or a prune message based on the information extracted by the header extracting unit 4410c, and delivers the packet to a corresponding processing unit based on the type of the packet determined. When the packet is determined as the join message, the type determining unit 4450c delivers the packet to the join-message processing unit

4421*c,* and when the packet is determined as the prune message, the type determining unit 4450*c* delivers the packet to the prune-message processing unit 4422*c*. The determination of the type of the packet can be carried out based on the same rule as the identifying rule shown in FIG. 4.

The join-message processing unit 4421*c* determines a sorting destination for the packet delivered from the type determining unit 4450*c* based on a path-sorting rule stored in the path-sorting-rule storing unit 4430*c*. When the path-sorting rule for sorting the packet is not stored in the path-sorting-rule storing unit 4430*c*, the join-message processing unit 4421*c* determines a most empty path based on information on the number of entries per path stored in the number-of-entries-per-path sorting unit 4431*c*, adds a path-sorting rule for sorting the packet to the most empty path in the path-sorting-rule storing unit 4430*c*, and updates the information on the number of entries per path stored in the number-of-entries-per-path sorting unit 4431*c*.

In this manner, the join-message processing unit 4421*c* dynamically adds the path-sorting rule by determining a load condition, and as a result, a load distribution of each of the routers is evenly carried out. In addition, because the addition of the path-sorting rule does not need a human operation, a load on the administrator is also reduced.

The prune-message processing unit 4422*c* is a processing unit that determines a sorting destination for the packet delivered from the type determining unit 4450*c* based on the path-sorting rule stored in the path-sorting-rule storing unit 4430*c*. Furthermore, the prune-message processing unit 4422*c* sets a flag indicating that a prune message is received in the path-sorting rule used for sorting the packet. The flag is cleared when the join-message processing unit 4421*c* carries out a sorting of the join message using the path-sorting rule. When the flag is not cleared even after a predetermined time has passed, the prune-message processing unit 4422*c* deletes the path-sorting rule by taking the path-sorting rule as an unused one, and updates the information on the number of entries per path stored in the number-of-entries-per-path sorting unit 4431*c*.

In this manner, the prune-message processing unit 4422*c* deletes the unused path-sorting rule to keep an effective load condition in the information on the number of entries per path, and as a result, a load distribution of each of the routers is evenly kept.

The timer 4423*c* is used for detecting that the flag set in the path-sorting rule by the prune-message processing unit 4422*c* is not cleared for the predetermined time. The path-sorting-rule storing unit 4430*c* is for storing the path-sorting rule for sorting the packet. FIG. 13 is a table for illustrating an example of the path sorting rule for the join-prune-packet sorting unit 4400*c* shown in FIG. 12. As shown in the figure, the path-sorting rule according to the present embodiment holds a pair of a multicast address and an output path for a packet having the multicast address, as well as a flag indicating that a prune message is received.

The number-of-entries-per-path sorting unit 4431*c* stores the information on the number of entries per path that indicates a load condition of each of the routers. FIG. 14 is a table for illustrating an example of the information on the number of entries per path. As shown in the figure, the information on the number of entries per path holds a value obtained by collecting the number of entries of the path-sorting rule for each of the output ports. For-example, the data on the first line indicates that there are two entries of rules that sort the packet to a port 1. This means that there are two multicast addresses that are sorted to the router corresponding to the port 1.

Figure 15:
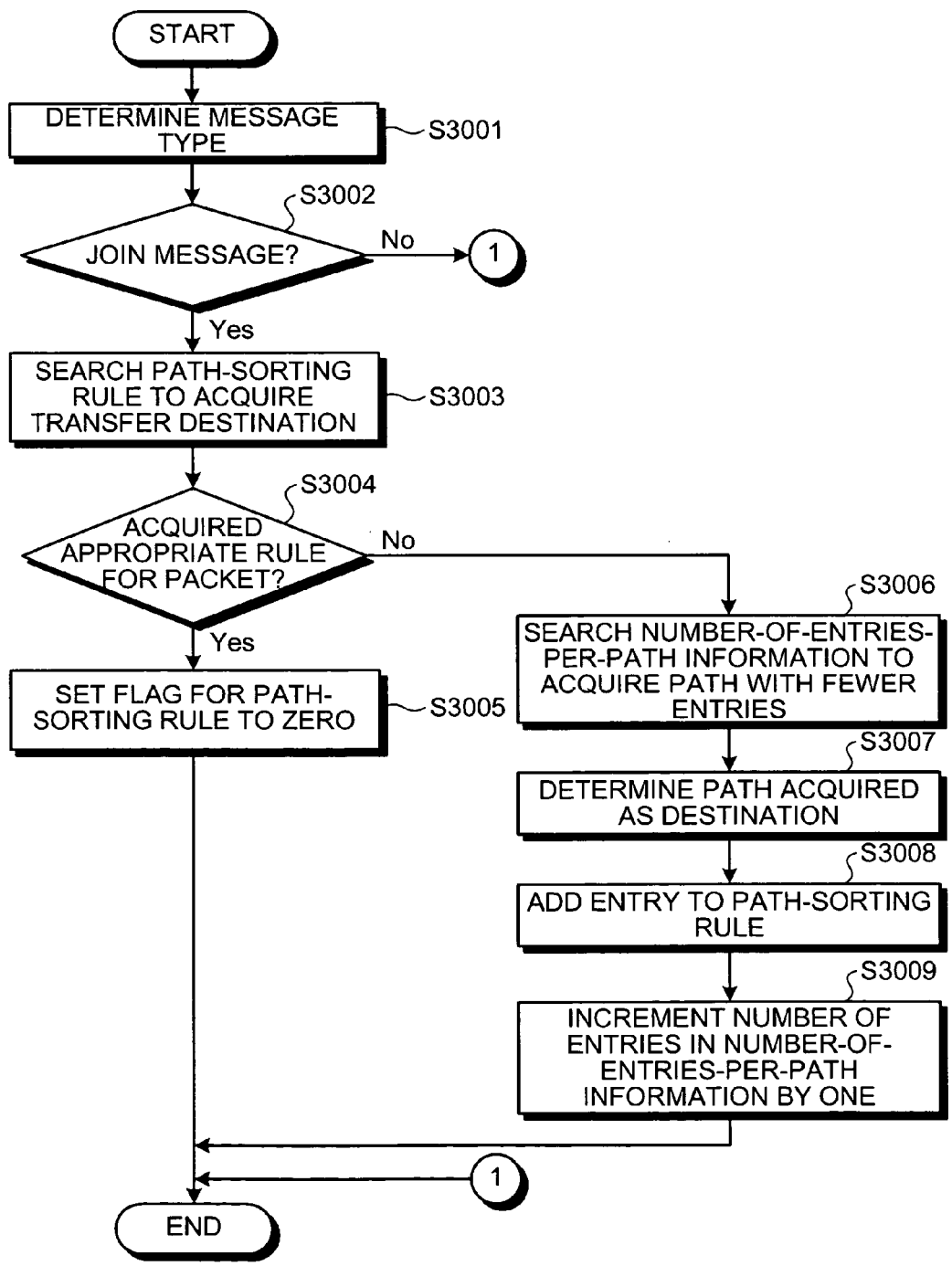
FIGS. 15 and 16 are flowcharts of a process procedure for determining a transfer destination according to the third embodiment.
Figure 16:
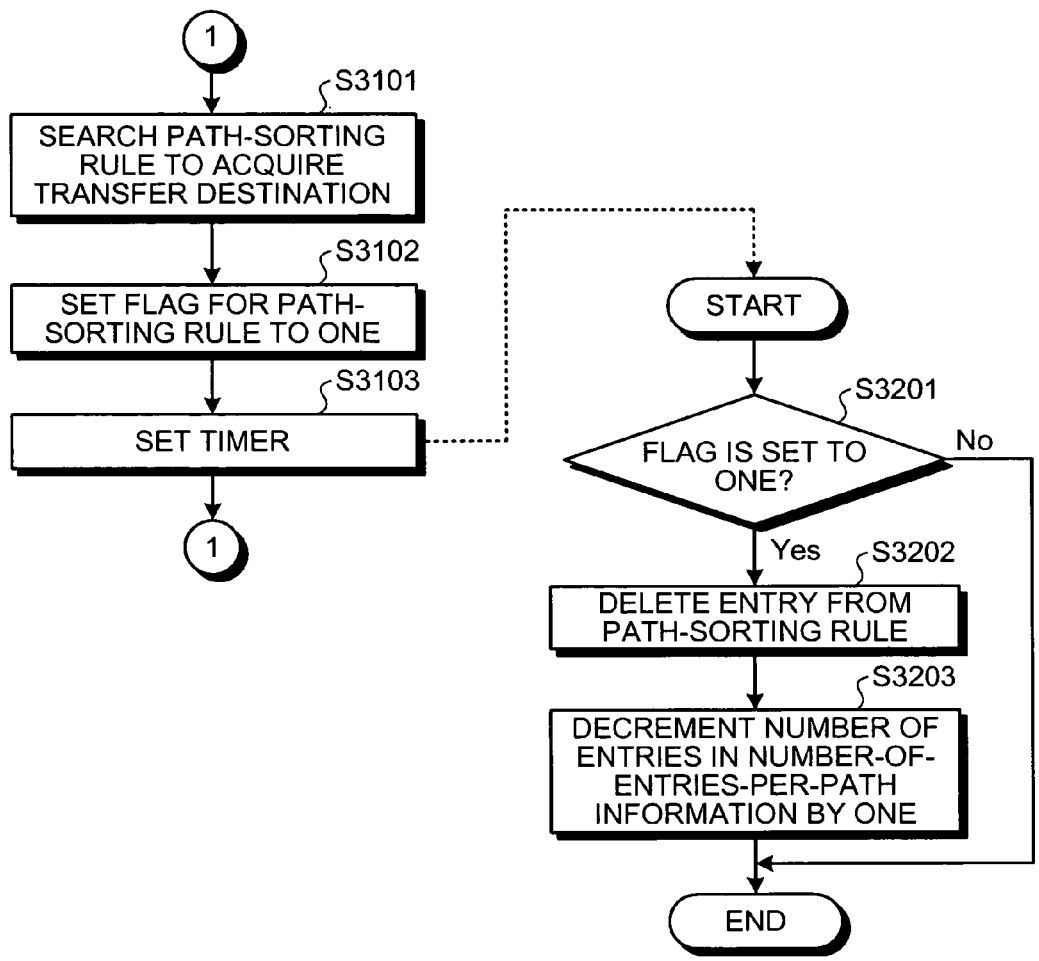

A process procedure of the load distributing apparatus according to the third embodiment is same as the process procedure of the load distributing apparatus according to the first embodiment except for the transfer-destination determining process. FIGS. 15 and 16 are flowcharts of a process procedure for determining a transfer destination according to the third embodiment. As shown in the figure, the join-prune-packet sorting unit 4400*c* determines a type of a packet at the type determining unit 4450*c* (Step S3001).

When the message is a join message (YES at Step S3002), the join-prune-packet sorting unit 4400*c* searches for a path-sorting rule at the join-message processing unit 4421*c*, and acquires information on a transfer destination (Step S3003). When an appropriate path-sorting rule for the packet is acquired (YES at Step S3004), the join-prune-packet sorting unit 4400*c* adopts a transfer destination defined in the path-sorting rule acquired, and sets a flag of the path-sorting rule to zero.

When the appropriate path-sorting rule for the packet is not acquired (NO at Step S3004), the join-prune-packet sorting unit 4400*c* searches for the information on the number of entries per path, acquires a path having the smallest number of entries (Step S3006), and adopts the path acquired as the transfer destination (Step S3007). Then, the join-prune-packet sorting unit 4400*c* adds a rule for carrying out a sorting to the path acquired in the path-sorting rule (Step S3008), and increments the number of the entries of the path in the information on the number of entries per path by one (Step S3009).

On the other hand, when the packet is a prune message as a result of Step S3001 (NO at Step S3002), the join-prune-packet sorting unit 4400*c* searches for a path-sorting rule at the prune-message processing unit 4422*c,* and adopts a transfer destination defined in the path-sorting rule searched (Step S3101). Then, the join-prune-packet sorting unit 4400*c* sets a flag of the rule to one (Step S3102), and resets a timer to start a clock (Step S3103).

When the timer times out, and the flag is still set to one (YES at Step S3201), the join-prune-packet sorting unit 4400*c* deletes the rule from the path-sorting rule (Step S3202), and decrements the number of entries of an output path of the rule by one (Step S3203). If the flag is reset to zero when the timer times out (NO at Step S3201), the join-prune-packet sorting unit 4400*c* does not carry out any particular process.

As described above, according to the third embodiment, it is configured that a path-sorting rule is dynamically set by considering an amount of sorting. Therefore, it is possible to realize an even distribution of a load on a router.

According to the third embodiment, an even load distribution is achieved by making up the number of entries of a path-sorting rule, i.e., the number of multicast addresses that take the sorting. However, when considering the entire network, there is a case in which this method is not appropriate. When there is a plurality of paths from a server that transmits multicast data, it is desirable to let a router connected to a path that becomes a short cut or a router connected to a path having the broadest bandwidth transmit the data.

The router connected to a path that becomes a short cut or the router connected to a path having the broadest bandwidth can be acquired by, for example, referring to information on routing of a unicast. Because it is necessary to refer to the information on routing of a unicast based on an IP address of the server, it would be better refer to the path-sorting rule based on the IP address of the server, too. A fourth embodiment of the present invention deals with a case in which the path-sorting rule is determined based on the IP address of the server.

Figure 17:
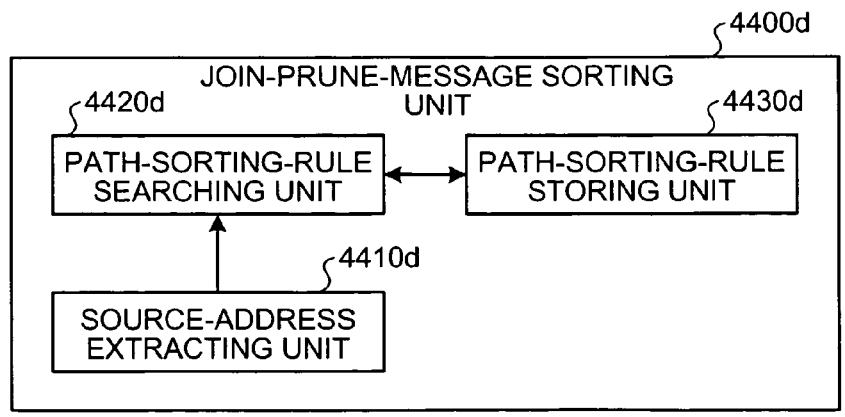
FIG. 17 is a functional block diagram of a join-prune-packet sorting unit of a load distributing apparatus according to a fourth embodiment of the present invention.

A configuration of a load distributing apparatus according to the fourth embodiment is the one in which the join-prune-packet sorting unit 4400a of the load distributing apparatus 4000a according to the first embodiment is replaced by a join-prune-packet sorting unit 4400d. FIG. 17 is a functional block diagram of the join-prune-packet sorting unit 4400d of the load distributing apparatus according to the fourth embodiment.

As shown in the figure, the join-prune-packet sorting unit 4400d includes a source-address extracting unit 4410d, a path-sorting-rule searching unit 4420d, and a path-sorting-rule storing unit 4430d. The source-address extracting unit 4410d is a processing unit that extracts an IP address of a server that is a transmission source of multicast data from a header part of a packet.

The path-sorting-rule searching unit 4420d searches for a path-sorting rule stored in the path-sorting-rule storing unit 4430d based on the IP address of server acquired by the source-address extracting unit 4410d as a key, and determines a sorting destination.

Figures 18, 19:
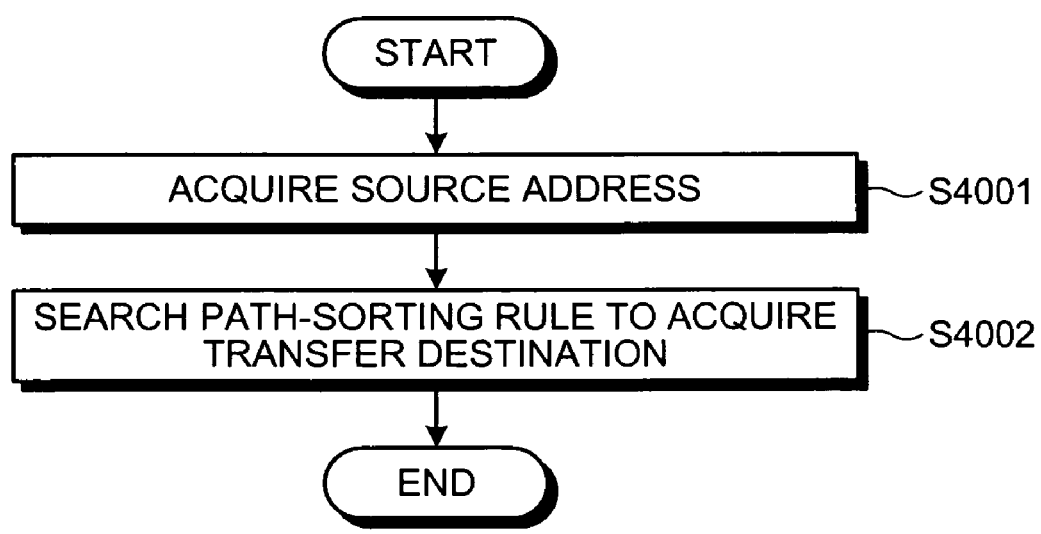
FIG. 18 is a table for illustrating an example of a path sorting rule for the join-prune-packet sorting unit shown in FIG. 17.
FIG. 19 is a flowchart of a process procedure for determining a transfer destination according to the fourth embodiment.

The path-sorting-rule storing unit 4430d stores the path-sorting rule for sorting the packet. FIG. 18 is a table for illustrating an example of the path sorting rule for the join-prune-packet sorting unit 4400d shown in FIG. 17. As shown in the figure, the path-sorting rule according to the present embodiment holds a pair of the IP address of the server that is the transmission source and an output path. These pieces of information can be automatically created from routing information, or can be set by the administrator. Furthermore, the path-sorting rule can hold an address and a subnet mask of a network to which the server that is the transmission source belongs, instead of the IP address of the server that is the transmission source.

A process procedure of the load distributing apparatus according to the fourth embodiment is same as the process procedure of the load distributing apparatus according to the first embodiment except for the transfer-destination determining process. FIG. 19 is a flowchart of a process procedure for determining a transfer destination according to the fourth embodiment. As shown in the figure, the join-prune-packet sorting unit 4400d acquires an IP address of a server that is a transmission source of data from a packet received (Step S4001), and searches for a path-sorting rule stored in the path-sorting-rule storing unit 4430d based on the IP address of the server as a key, acquires information on a transfer destination, and designates the transfer destination based on the information acquired (Step S4002).

As described above, according to the fourth embodiment, it is configured that a path-sorting rule is set based on an IP address of a transmission source of data. Therefore, it is possible to transfer multicast data via a most appropriate path by using information on routing a unicast in conjunction with the path-sorting rule.

When a plurality of routers is connected to a LAN, it is possible not only to carry out a load distribution to the routers, but also to provide a redundancy so that another router takes a transfer of multicast data when a failure occurs in a part of the routers or in a part of the paths. A fifth embodiment of the present invention deals with a case in which a redundancy against a failure is realized. A method of implementing the load distribution can be any one of methods according to the first to fourth embodiments.

Figure 20:
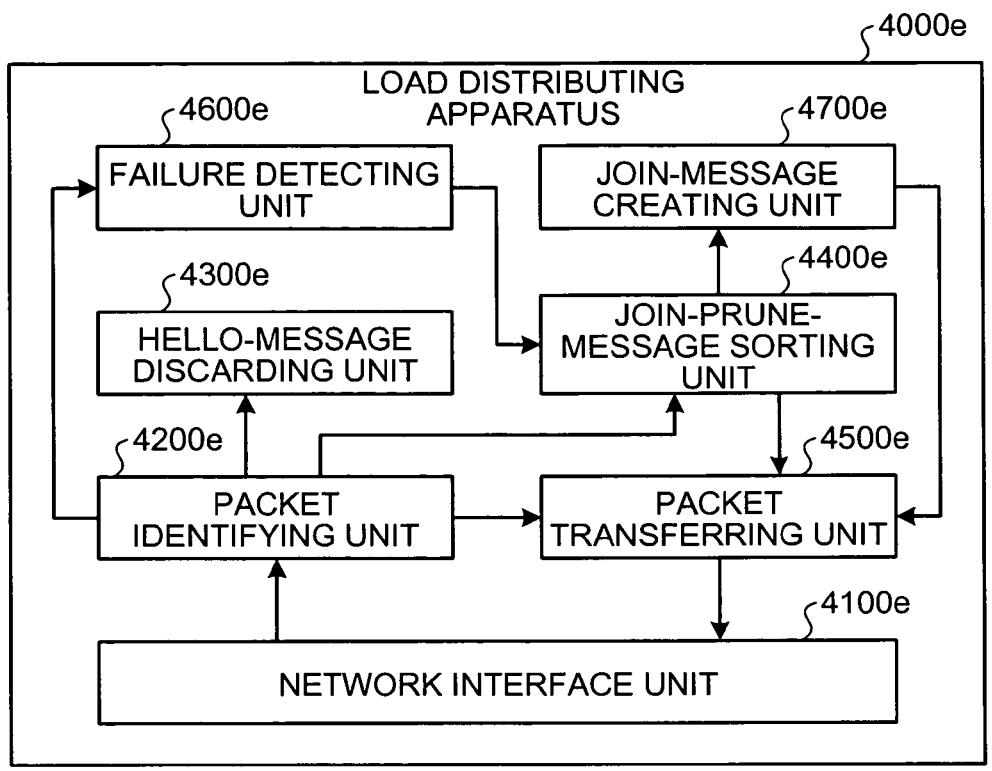
FIG. 20 is a functional block diagram of a load distributing apparatus according to a fifth embodiment of the present invention.

FIG. 20 is a functional block diagram of a load distributing apparatus according to the fifth embodiment. As shown in the figure, the load distributing apparatus 4000e includes a network interface unit 4100e, a packet identifying unit 4200e, a hello-message discarding unit 4300e, a join-prune-packet sorting unit 4400e, a packet transferring unit 4500e, a failure detecting unit 4600e, and a join-message creating unit 4700e.

The network interface unit 4100e is an interface unit for carrying out an exchange of packets via a network. The network interface unit 4100e includes a plurality of ports for connecting to the routers and one or more ports for connecting to the LAN. The ports for connecting to the routers does not necessarily have to be a plurality of numbers physically, but can be divided into a plurality of ports virtually by a VLAN.

The packet identifying unit 4200e identifies a type of the packet received by the network interface unit 4100e, and delivers the packet to a corresponding processing unit based on the type of the packet identified. When the packet received is identified as a hello message, the packet is delivered to the hello-message discarding unit 4300e, when the packet received is identified as a join message or a prune message, the packet is delivered to the join-prune-packet sorting unit 4400e, and when the packet received is identified as other type of packet, the packet is delivered to the packet transferring unit 4500e. In addition, when the packet received is identified as the hello message, the packet is also delivered to the failure detecting unit 4600e.

The hello-message discarding unit 4300e is a processing unit that discards the hello message without transferring it. The join-prune-packet sorting unit 4400e is a processing unit that determines a destination router to sort the join message and the prune message based on a predetermined rule. Furthermore, when the failure detecting unit 4600e detects a failure in one of the routers, the join-prune-packet sorting unit 4400e updates a path-sorting rule in which the packet is supposed to be sorted to the router in which the failure is detected to change a setting such that the packet is sorted to other router. In addition, the join-prune-packet sorting unit 4400e instructs the join-message creating unit 4700e to transmit a join message to a router that becomes a new sorting destination.

In this manner, when a failure is detected, it is possible to realize a redundancy against the failure by updating a path-sorting rule to change a sorting destination for a join message from a router having the failure to which the join message is sorted to other router. Furthermore, because the join-message creating unit 4700e transmits the join message to a router that becomes a new sorting destination, a transfer of multicast data is resumed in an early stage.

Figure 21:
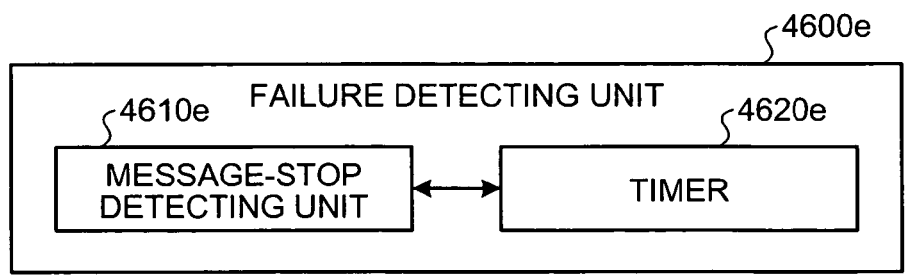
FIG. 21 is a functional block diagram of a failure detecting unit of the load distributing apparatus according to the fifth embodiment.

The failure detecting unit 4600e is a processing unit that monitors a hello message transmitted from a router, when there is a router from which a hello message is not transmitted for a predetermined time, determines that there is a failure in the router, and notifies an occurrence of a failure to the join-prune-packet sorting unit 4400e. FIG. 21 is a functional block diagram of the failure detecting unit 4600e of the load distributing apparatus according to the fifth embodiment. As shown in the figure, the failure detecting unit 4600e includes a message-stop detecting unit 4610e and a timer 4620e.

When a hello message is received, the message-stop detecting unit 4610e starts a timer corresponding to a port that received the hello message. Then, when a hello message is not received at the port for a predetermined time, and when the timer times out, determines that there is a failure in a router that is connected to the port, and notifies an occurrence of a failure to the join-prune-packet sorting unit 4400e.

The join-message creating unit 4700e is a processing unit that creates a join message to be transmitted to a router that is designated by the join-prune-packet sorting unit 4400e, and makes a request for a transfer of the join message to the packet transferring unit 4500e. The packet transferring unit 4500e transfers a packet delivered from the packet identifying unit 4200*e*, the join-prune-packet sorting unit 4400*e*, and the join-message creating unit 4700*e*, via the network interface unit 4100*e*.

Figure 22:
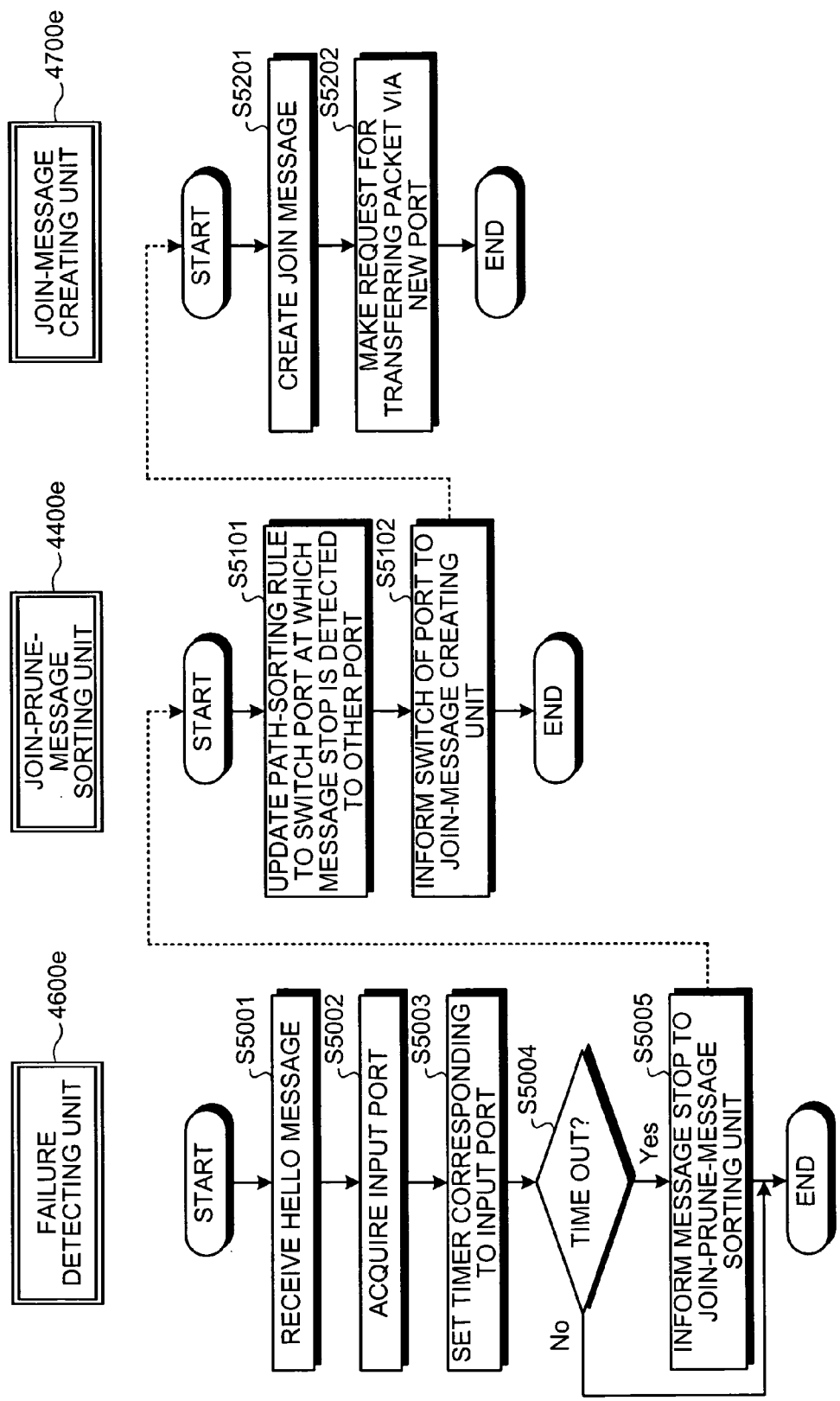
FIG. 22 is a flowchart of a process procedure for a case in which a message loss is detected.

Following is an explanation for a process procedure for the load distributing apparatus 4000*e*. A process at a time of a normal operation is virtually the same as the processes according to the first to fourth embodiments, a process procedure at a time of an abnormal operation will be explained here. FIG. 22 is a flowchart of a process procedure for a case in which a message-stop is detected.

When a hello message is received (Step S5001), the failure detecting unit 4600*e* acquires a port that received the hello message (Step S5002), and starts a timer corresponding to the port (Step S5003). Then, when a hello message is not received at the port for a predetermined time, and when the timer times out (YES at Step S5004), the failure detecting unit 4600*e* notifies the join-prune-packet sorting unit 4400*e* that a message-stop is occurred (Step S5005).

The join-prune-packet sorting unit 4400*e* that receives a notification of an occurrence of a failure updates a path-sorting rule, and replaces a port in which the message-stop is detected by other port (Step S5101). Then the join-prune-packet sorting unit 4400*e* instructs the join-message creating unit 4700*e* to transmit a join message to a router that is connected to a port that is set as a new sorting destination (Step S5102).

The join-message creating unit 4700*e* creates a join message to be transmitted to a router that is designated by the join-prune-packet sorting unit 4400*e* (Step S5201), and makes a request for a transfer of the join message to the packet transferring unit 4500*e* (Step S5202).

As described above, according to the fifth embodiment, it is configured that a processing unit that detects a failure of a router is added, and when a failure is detected in a router, a path-sorting rule in which the router having the failure is a sorting destination is updated so that the sorting destination is changed to other router. Therefore, it is possible to let other router takes a transfer process when a failure occurs in a router, and as a result, a redundancy against the failure can be realized.

Furthermore, according to the fifth embodiment, a failure is detected by monitoring a hello message. However, the failure can also be detected by monitoring multicast data instead of the hello message. Furthermore, it is also possible to detect a failure by transmitting an echo-request message, such as a PING, to each of the routers periodically if there is no response to the echo-request message for a predetermined time.

According to the first to the fifth embodiments, it is assumed that all of the multicast data are treated evenly. However, when there is a limit in a bandwidth, it may be necessary to treat particular multicast data with priority. For this reason, a sixth embodiment of the present invention deals with a case in which a priority is given to the multicast data.

Figures 23, 24:
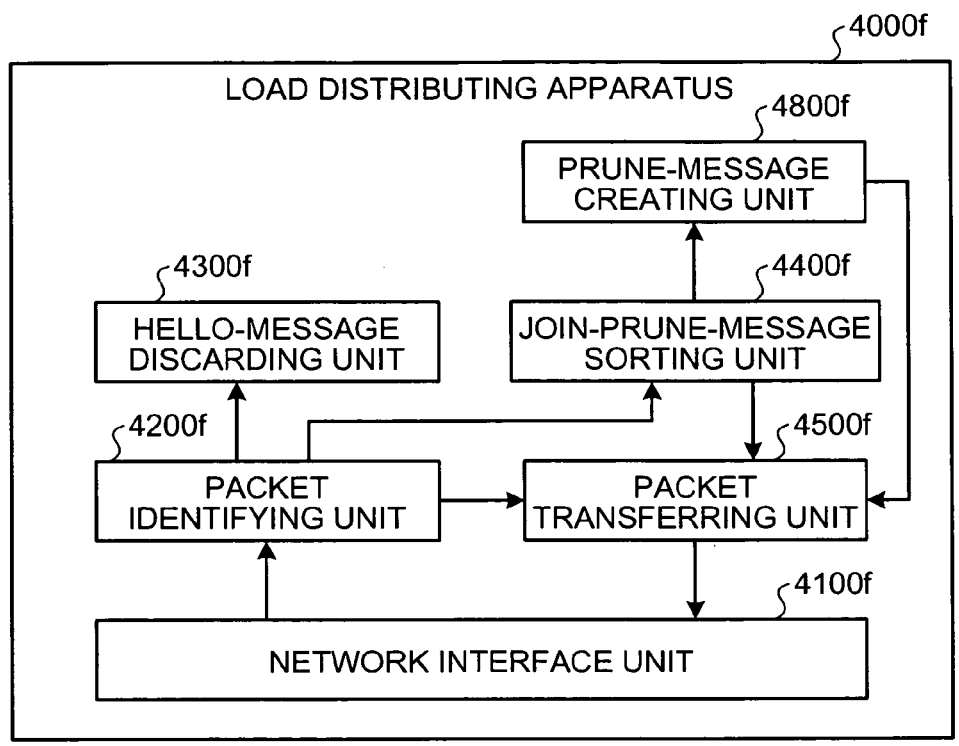
FIG. 23 is a functional block diagram of a load distributing apparatus according to a sixth embodiment of the present invention.
FIG. 24 is a table for illustrating an example of a path sorting rule for the join-prune-packet sorting unit of the load distributing apparatus according to the sixth embodiment.

FIG. 23 is a functional block diagram of a load distributing apparatus according to the sixth embodiment. As shown in the figure, the load distributing apparatus 4000*f* includes a network interface unit 4100*f*, a packet identifying unit 4200*f*, a hello-message discarding unit 4300*f*, a join-prune-packet sorting unit 4400*f*, a packet transferring unit 4500*f*, and a prune-message creating unit 4800*f*.

The network interface unit 4100*f* is an interface unit for carrying out an exchange of packets via a network. The network interface unit 4100*f* includes a plurality of ports for connecting to the routers and one or more ports for connecting to the LAN. The ports for connecting to the routers does not necessarily have to be a plurality of numbers physically, but can be divided into a plurality of ports virtually by a VLAN.

The packet identifying unit 4200*f* identifies a type of the packet received by the network interface unit 4100*f*, and delivers the packet to a corresponding processing unit based on the type of the packet identified. When the packet received is identified as a hello message, the packet is delivered to the hello-message discarding unit 4300*f*, when the packet received is identified as a join message or a prune message, the packet is delivered to the join-prune-packet sorting unit 4400*f*, and when the packet received is identified as other type of packet, the packet is delivered to the packet transferring unit 4500*f*.

The hello-message discarding unit 4300*f* is a processing unit that discards the hello message without transferring it. The join-prune-packet sorting unit 4400*f* is a processing unit that determines a destination router to sort the join message and the prune message based on a predetermined rule.

When a join message for a new multicast address is received, the join-prune-packet sorting unit 4400*f* selects, when the number of multicast addresses for which a transfer process is already carried out is over a predetermined number, and when a priority of the new multicast address is higher than that of existing multicast addresses, a multicast address of a lowest priority from among the multicast addresses for which the transfer process is carried out on the same path. Then, join-prune-packet sorting unit 4400*f* instructs the prune-message creating unit 4800*f* to transmit a prune message in which the multicast address selected is set. In this manner, when a load is over a predetermined level, it is possible to secure a bandwidth of multicast data having a high priority by stopping a transfer of multicast data having a low priority.

FIG. 24 is a table for illustrating an example of a path sorting rule for the join-prune-packet sorting unit 4400*f* of the load distributing apparatus according to the sixth embodiment. As shown in the figure, a path-determining rule according to the present embodiment holds a pair of a multicast address and an output path for a packet corresponding to the multicast address, as well as a priority.

The prune-message creating unit 4800*f* is a processing unit that creates a prune message to be transmitted to a router that is designated by the join-prune-packet sorting unit 4400*f*, and makes a request for a transfer of the prune message to the packet transferring unit 4500*f*. The packet transferring unit 4500*f* transfers a packet delivered from the packet identifying unit 4200*f*, the join-prune-packet sorting unit 4400*f*, and the prune-message creating unit 4800*f*, via the network interface unit 4100*f*.

As described above, according to the sixth embodiment, it is configured that a transfer of multicast data having a low priority is stopped when a load is over a predetermined level. Therefore, it is possible to secure a bandwidth of multicast data having a high priority.

According to the present invention, it is configured that a join message and a prune message are sorted to a router from a terminal based on a path sorting rule. Therefore, it is possible to realize a load distribution for a transfer process without placing a burden on each of the routers. In addition, because there is no need for exchanging messages between the routers for the load distribution, a high-speed transfer start operation is also possible.

Furthermore, according to the present invention, it is configured that a hello messaged to be transferred from a router is discarded before other router receives the hello message.

Therefore, it is possible, when a plurality of routers is connected to a LAN, to make all of the routers carry out a transfer of multicast data.

Moreover, according to the present invention, it is configured that the path sorting rule is dynamically registered by determining a load situation. Therefore, it is possible to equalize a load on each of the routers.

Furthermore, according to the present invention, when a failure is detected at a router, a sorting rule in which the router having the failure is allocated to a sorting destination is updated to have other router as the sorting destination. Therefore, when there is a failure at a router, it is possible to make a router carry out a transfer process.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A load distributing apparatus that is connected to a plurality of routers carrying out a transfer of multicast data to a plurality of terminals, the load distributing apparatus comprising:
a network interface unit that receives a packet via a network;
a packet identifying unit that identifies the received packet as a join message received from the terminals, a prune message received from the terminals, or a hello message received from the routers;
a hello-message discarding unit that discards the identified hello message transferred from one of the routers to another router;
a path-sorting-rule storing unit that stores a path-sorting rule for sorting the identified join message or the identified prune message and for specifying, for the sorted join message or the sorted prune message, a router among the routers;
a packet sorting unit that sorts the identified join message or the identified prune message and specifies, for the sorted join message or the sorted prune message, a router among the routers based on the path-sorting rule stored in the path-sorting-rule storing unit; and
a packet transferring unit that transfers the sorted join message or the sorted prune message to the specified router that carries out the transfer of multicast data in response to the sorted join message or the sorted prune message.

2. The load distributing apparatus according to claim 1, wherein the packet sorting unit dynamically adds another path-sorting-rule to dynamically adjust a load distributed on the routers.

3. The load distributing apparatus according to claim 1, wherein the packet sorting unit carries out an operation based on a multicast address included in the join message or the prune message, converts a result of the operation into a numerical value, and acquires information on a sorting destination from the path-sorting rule based on the numerical value.

4. The load distributing apparatus according to claim 1, wherein
the join message or the prune message includes an internet-protocol address of a transmission source of the multicast data, and
the packet sorting unit acquires information on a sorting destination from the path-sorting rule based on the internet-protocol address of the transmission source.

5. The load distributing apparatus according to claim 1, further comprising a failure detecting unit that detects a failure of at least one of the routers, wherein
when the failure detecting unit detects the failure, the packet sorting unit updates the path-sorting rule in which the router having the failure is set as a sorting destination, to replace the router having the failure with another router.

6. The load distributing apparatus according to claim 5, further comprising a join-message creating unit that creates, when the failure detecting unit detects the failure, and when the packet sorting unit replaces the router with the another router, a join message that is transmitted to the another router that becomes a new sorting destination.

7. The load distributing apparatus according to claim 5, wherein the failure detecting unit detects the failure by monitoring a hello message transmitted from the router.

8. The load distributing apparatus according to claim 5, wherein the failure detecting unit detects the failure of the router by monitoring multicast data transmitted from the router.

9. The load distributing apparatus according to claim 5, wherein
the failure detecting unit transmits a message requesting a response to the router, and
when there is no response for a time duration, the failure detecting unit detects the failure of the router.

10. The load distributing apparatus according to claim 1, further comprising a priority storing unit that stores a priority for each of multicast addresses, wherein
when a load on a router is over a threshold, the packet sorting unit instructs the router to stop a transfer of data corresponding to a multicast address having the lowest priority among the multicast addresses, based on the priority stored in the priority storing unit.

11. A method of controlling a plurality of routers carrying out a transfer of multicast data to a plurality of terminals, the method comprising:
receiving at least one packet via a network;
identifying the received packet as a join message received from the terminals, a prune message received from the terminals, or a hello message received from the routers;
discarding the identified hello message transferred from one of the routers to another router;
storing a path-sorting rule for sorting the identified join message or the identified prune message and for specifying, for the sorted join message or the sorted prune message, a router among the routers in a path-sorting-rule storing unit;
sorting the identified join message or the identified prune message and specifying, for the sorted join message or the sorted prune message, a router among the routers based on at least one path-sorting rule stored in the path-sorting-rule storing unit; and
transferring the sorted join message or the sorted prune message to the specified router that carries out the transfer of multicast data in response to the sorted join message or the sorted prune message.

12. A load distributing apparatus that is connected to a plurality of routers carrying out a transfer of multicast data to a plurality of terminals, the load distributing apparatus comprising:
a network interface unit to receive at least one packet via a network;
a packet identifying unit to identify the received at least one packet as one of a plurality of packet types, the plurality of packet types including a hello message packet type, a join message packet type, and a prune message packet type, the at least one packet identified as the hello message type being received from the routers, and the at least one packet identified as the join message packet type or the prune message packet type being received from the terminals;

a hello-message discarding unit to discard the at least one packet that is identified as the hello-message packet type and is transferred from one of the routers to another router;

a path-sorting-rule storing unit to store at least one path-sorting rule for sorting the received at least one packet and for specifying, for the sorted at least one packet, a router among the routers;

a packet sorting unit to sort each of the at least one packet based on the packet type identified by the packet identifying unit and specify, for the sorted at least one packet of the identified join message packet type or the identified prune message packet type, a router among the routers based on the at least one path-sorting rule stored in the path-sorting-rule storing unit; and a packet transferring unit to transfer the sorted at least one packet of the identified join message packet type or the identified prune message packet type to the specified router that carries out the transfer of multicast data in response to the sorted at least one packet of the identified join message packet type or the identified prune message packet type.

13. The load distributing apparatus according to claim 12, wherein the packet sorting unit at least one of dynamically modifies an existing path-sorting rule stored in the path-sorting-rule storing unit or adds another path-sorting-rule to the path-sorting-rule storing unit adjust a load that is distributed among the routers to be evenly distributed.

14. The load distributing apparatus according to claim 12, further comprising:

a failure detecting unit to detect a failure of at least one of the routers, wherein
when the failure detecting unit detects the failure, the packet sorting unit updates the at least one path-sorting rule in which the router having the failure is set as the destination, to replace the router having the failure with another router.

15. The load distributing apparatus according to claim 14, further comprising:

a join-message creating unit to create, when the failure detecting unit detects the failure, and when the packet sorting unit replaces the router with the another router, a join message that is transmitted to the another router that becomes a new sorting destination.

16. The load distributing apparatus according to claim 14, wherein the failure detecting unit detects the failure by monitoring packets identified as a hello message packet type.

17. The load distributing apparatus according to claim 14, wherein the failure detecting unit detects the failure by monitoring multicast data transmitted from the at least one router.

18. The load distributing apparatus according to claim 14, wherein
the failure detecting unit transmits a message requesting a response to a router, and
when there is no response for a time duration, the failure detecting unit detects the failure of the router.

19. The load distributing apparatus according to claim 2, wherein the another path-sorting-rule is added to dynamically adjust the load to be evenly distributed among each of the routers.

20. The load distributing apparatus according to claim 12, wherein the path-sorting rule prevents a single router from being a designated router that controls routing of all the at least one received packets.

* * * * *